A. W. PAULSON.
AIR BRAKE LOCK.
APPLICATION FILED NOV. 17, 1919.

1,389,070.

Patented Aug. 30, 1921.
2 SHEETS—SHEET 1.

Inventor
A. W. Paulson
By Philip A. H. Terrell
Attorney

A. W. PAULSON.
AIR BRAKE LOCK.
APPLICATION FILED NOV. 17, 1919.

1,389,070.

Patented Aug. 30, 1921.
2 SHEETS—SHEET 2.

Inventor
A. W. Paulson by
Philip A. H. Sewell
Attorney

UNITED STATES PATENT OFFICE.

ANTON WILHELM PAULSON, OF OMAHA, NEBRASKA.

AIR-BRAKE LOCK.

1,389,070.  Specification of Letters Patent.  Patented Aug. 30, 1921.

Application filed November 17, 1919. Serial No. 338,576.

*To all whom it may concern:*

Be it known that I, ANTON WILHELM PAULSON, a subject of Sweden, residing at Omaha, in the county of Douglas and State of Nebraska, have invented certain new and useful Improvements in Air-Brake Locks, of which the following is a specification, reference being had therein to the accompanying drawing.

The invention relates to locks for air brakes and has for its object to provide a mechanism whereby when a car is uncoupled and detached from the air line of the train the brakes which are set and in engagement with the wheels will remain in said locked condition until the car is again coupled to a train and air again supplied to the train line.

A further object is to provide a brake lock for air brake systems comprising a longitudinally movable shaft having a spiral groove therein which passes through the ratchet wheel under the tension of a spring when the plunger shaft of the brake cylinder moves outwardly during a brake applying operation. The ratchet holding the shaft in its outward position by means of a detent lever, which lever will be rocked to release the shaft and ratchet wheel automatically by pressure from the brake pipe.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
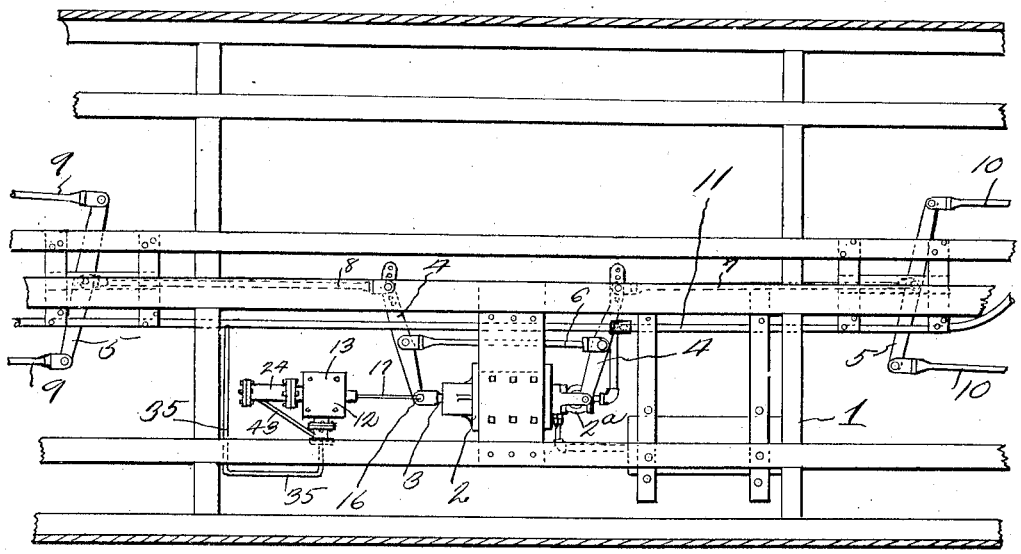
Figure 1 is a horizontal sectional view through the lower portion of a car showing the conventional form of brake actuating mechanism and showing the lock applied thereto.
Figure 2:
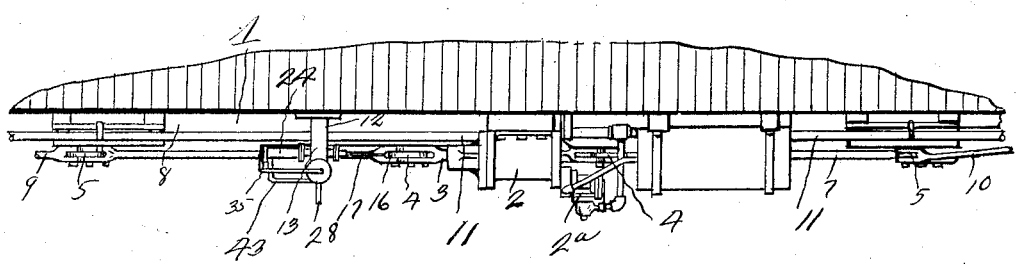
Fig. 2 is a side elevation of the brake actuating mechanism showing the lock applied thereto.
Figure 3:
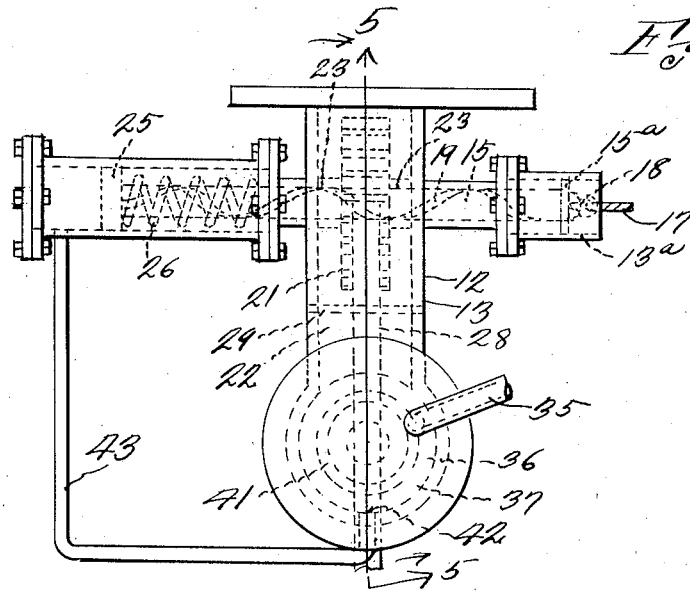
Fig. 3 is a front elevation of the brake lock.
Figure 4:
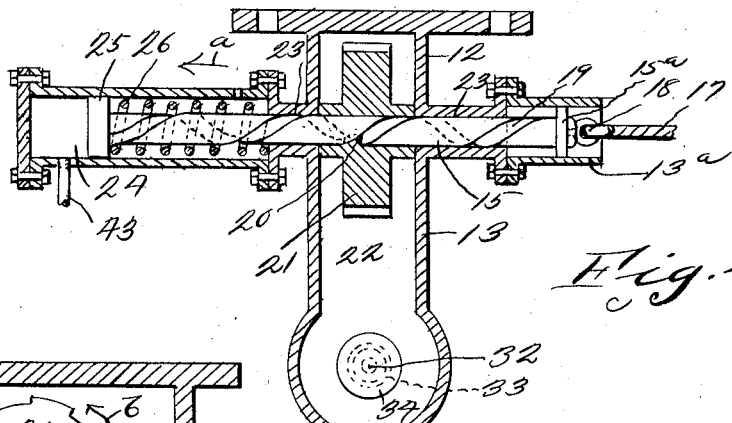
Fig. 4 is a longitudinal sectional view through the brake lock.

Referring to the drawings, the numeral 1 designates the underframing of a car to which the air brake operating mechanism is attached. The air brake operating mechanism is of a conventional form and comprises the brake cylinder 2, which has longitudinally movable therein a plunger rod 3 which is adapted to be forced outwardly to set the brakes through a series of levers 4 and 5 through the medium of connecting rods 6, 7, 8, 9 and 10. The rods 9 and 10 being connected to mechanism for forcing the brake shoes into engagement with the wheel treads.

In the present air brake mechanism when a car is uncoupled from an engine the brakes will apply or "set" and stay set only as long as there is sufficient pressure of air. As it is impossible to prevent brakes from "leaking off," therefore after the train line 11 uncoupled the plunger rod 3 moves into the brake cylinder 2 which releases the brakes and to obviate this releasing of the brakes, a brake lock 12 is provided. The brake lock 12 comprises a casing 13 adapted to be secured to the underframing of the car and has transversely movable therein a shaft 15, one end of which is connected to the end 16 of the plunger rod by means of a cable or chain 17, said cable or chain 17 being pivotally connected as at 18 to the end of the shaft 15. One end of the shaft 15 is provided with a squared portion 15$^a$ which portion is slidable in a channel 13$^a$ of the casing 13 so that shaft 15 will move axially and rotate the ratchet wheel. The shaft 15 is provided with a spiral groove 19 which passes through a spiral groove 20 in a ratchet wheel 21 rotatably mounted in the chamber 22 in the casing 13 and is prevented from axial movement when the shaft 15 is forced therethrough by the side walls of the casing 13. Shaft 15 is slidably mounted in bearings 23 carried by the side walls of the casing 13. An air chamber 24 is secured to one of the side walls and in which air chamber a piston 25 which is carried by one end of the shaft 15 and is adapted to be forced against the action of the coil spring 26 by air which passes through a pipe 27 leading from the brake pipe 11. A detent lever 28 is pivoted within the chamber 22 as at 29 and has its nose in engagement with one of the teeth of the ratchet wheel 21 as at 30, the lower end of said detent lever passing downwardly through an aperture 31 in the lower end of the casing 13, so that, if so desired the detent lever may be manually rocked when it is desired to release the brakes by allowing the rotation of the ratchet wheel 21 and consequent inward movement of the plunger rod 3. The nose of the detent lever 29 is normally held in engagement with the teeth of the ratchet by means of a spring actuated stop 32 which has a spring 33 disposed between the head 34 thereof and the rear wall of the casing 13. It will be seen that the coil spring 33 will keep the nose of the detent lever in engagement with the ratchet wheel and allow said nose to slide over the teeth as desired. However the detent lever 28 may be released when the cars are coupled and the train line again connected so that air will pass through the pipe 35 to the cylinder 36, in which cylinder a piston 37 is adapted to be moved by the air admitted through the pipe 35. The piston 37 has a piston rod 38 connected thereto which rod is slidably mounted in a bearing 39 carried by the cylinder 36. The rear end 40 of the rod 38 is adapted to engage the detent lever 28, thereby rocking its nose out of engagement with the ratchet wheel 21 and allowing the air admitted to the piston chamber 24 to force the shaft axially outward so that the plunger rod 3 may move inwardly and release the brakes. It is to be noted that when air is in the pipes 43 and 35 and consequently in the chambers 24 and 36 that the cable 17, connecting shaft 15 and plunger rod 3, is hanging slack, consequently the lock will not interfere with operations of brakes.

Figure 5:
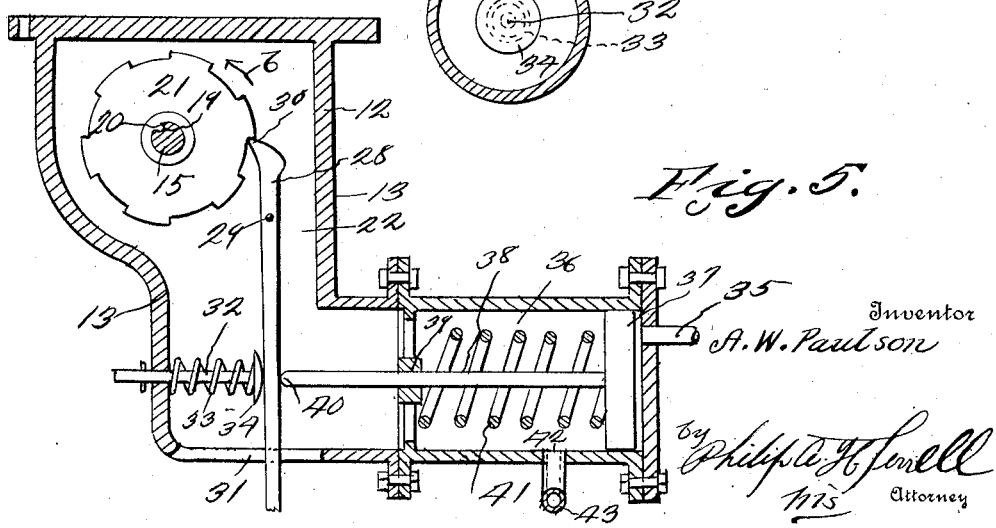
Fig. 5 is a sectional view taken on line 5—5 of Fig. 3.

The operation is as follows. When a car is uncoupled from an engine, the air in brake pipe will flow out through the open angle cock 2ᵃ automatically applying the brakes. Consequently the air will exhaust from the chamber 24, pipe 43, chamber 36, pipe 35 and through the empty brake pipe 11 out to the atmosphere thereby allowing the spring 26 to move the shaft 15 in the direction of the arrow *a*. During this longitudinal movement of the shaft 15, the ratchet wheel 21 will be rotated in the direction of the arrow *b*, Fig. 5, which will cause the nose of the detent lever 28 having been put in contact with ratchet 21 by spring 33 after air in chamber 26 has been discharged causes an inward movement of rod 38 by spring 41 to cam its teeth and when the spring 26 has forced the shaft to the proper distance inwardly, said detent lever will prevent the retrograde movement of the ratchet 21 which will hold the shaft in the position to which it has been moved. However, after the car has been uncoupled and the train line also uncoupled, if it is desired to release the shaft 15 and consequently the brakes all that will be necessary to do is for the brakemen to manually rock the detent lever 28 which will allow the plunger rod 3 to move inwardly. However if the brakes are not manually released they will be released when the train line is coupled up with a train for the reason that air will pass into the chamber 36 and move the piston 37 and its piston rod 38 and consequently rock the detent lever 28. This will open up the passage 42 in chamber 36 leading into pipe 43 through which the air will flow into chamber 24, forcing spiral shaft 15 outwardly by the air pressure acting on piston 25.

The invention having been set forth what is claimed as new and useful is:—

1. An air brake lock comprising a shaft axially movable in a casing, said shaft having one of its ends connected to the brake operating mechanism of a car, said shaft having a spiral groove therein, a ratchet disposed on said shaft and having a corresponding spiral rib disposed in the spiral groove of the shaft, said shaft being normally held against axial movement by the air within the train line, means for axially moving the shaft when the train line is uncoupled thereby causing the rotation of the ratchet, detent means for holding the ratchet against retrograde movement and means operated by the train line whereby said detent means will be released when the train line is coupled.

2. An air brake lock comprising a shaft axially movable in a casing, said shaft having one of its ends connected to the brake operating mechanism of a car, said shaft being provided with a spiral groove and axially movable in bearings, a ratchet wheel disposed on the shaft and having a corresponding spiral rib disposed in the spiral groove of the shaft, one end of the shaft being provided with a piston movable in a cylinder and being normally held against axial movement by the air within the train line, means for axially moving the shaft when the train line is uncoupled, a detent coöperating with the ratchet wheel to prevent retrograde movement of the same when the same is rotated by the axial movement of the shaft, and air tripping means for releasing the detent lever when the train line is coupled to another car thereby allowing the axially movable shaft to be forced axially to its brake releasing position.

3. An air brake lock comprising a shaft axially movable in a casing, said shaft having one of its ends connected to the brake operating mechanism of a car, said shaft being axially movable in bearings and having a spiral groove, a ratchet wheel disposed on the shaft and having a corresponding spiral rib disposed in the spiral groove of the shaft, one end of the shaft being provided with a piston movable in a cylinder and being normally held against axial movement by the air within the train line, means for axially moving the shaft when the train line is uncoupled, a detent coöperating with the ratchet wheel to prevent retrograde movement of the same when the same is rotated by the axial movement of the shaft, air tripping means for releasing the detent lever when the train line is coupled to another car thereby allowing the axially movable shaft to be forced axially to its brake releasing position and means whereby the air utilized for said tripping means will be allowed to exert pressure for moving the axially movable shaft.

In testimony whereof I hereunto affix my signature.

ANTON WILHELM PAULSON.